United States Patent [19]

Engelhardt et al.

[11] Patent Number: 5,071,301
[45] Date of Patent: Dec. 10, 1991

[54] MODIFIED ROLLED THREAD FORM FOR STUDS

[75] Inventors: Dale F. Engelhardt, Orland Park; Christian A. Wehlus, Burbank, both of Ill.

[73] Assignee: General Motors Corporation, Detroit, Mich.

[21] Appl. No.: 662,154

[22] Filed: Feb. 28, 1991

[51] Int. Cl.⁵ .............................................. F16B 35/00
[52] U.S. Cl. .................................. 411/389; 411/305; 411/386; 411/418
[58] Field of Search ............... 411/386, 387, 416, 417, 411/418, 419, 389, 305, 306, 324

[56] References Cited

U.S. PATENT DOCUMENTS

| | | | |
|---|---|---|---|
| 2,901,019 | 8/1959 | Schweppe | 411/308 |
| 3,451,080 | 6/1969 | McIntyre et al. | 411/418 |
| 3,492,908 | 2/1970 | Thurston . | |
| 3,878,759 | 4/1975 | Carlson | 411/416 |
| 4,258,607 | 3/1981 | McKewan . | |
| 4,331,414 | 5/1982 | Wheatley, Jr. | 411/389 |
| 4,673,323 | 6/1987 | Russo | 411/418 |
| 4,973,209 | 11/1990 | Essom et al. | 411/386 |

FOREIGN PATENT DOCUMENTS 2405430 9/1974 Fed. Rep. of Germany .
582306 11/1946 United Kingdom .
669157 3/1952 United Kingdom .

OTHER PUBLICATIONS

Engine Maintenance Manual, Electro-Motive, Section 4, p. 4-1(no date).

*Primary Examiner*—Neill R. Wilson
*Attorney, Agent, or Firm*—Robert J. Outland

[57] ABSTRACT

A stud for securing a cylinder liner to a head has a modified thread form engaging a threaded hole in the stud with an interference fit. The thread is rolled and all threads have the same pitch diameter except the endmost thread. Three relief channels are formed in the threads and extend axially from the stud end through several threads while some full threads remain to engage the hole. The relief channels decrease hoop stress in the threaded hole and allow debris developed during installation to escape from the thread interface to prevent entrapment therein.

7 Claims, 1 Drawing Sheet

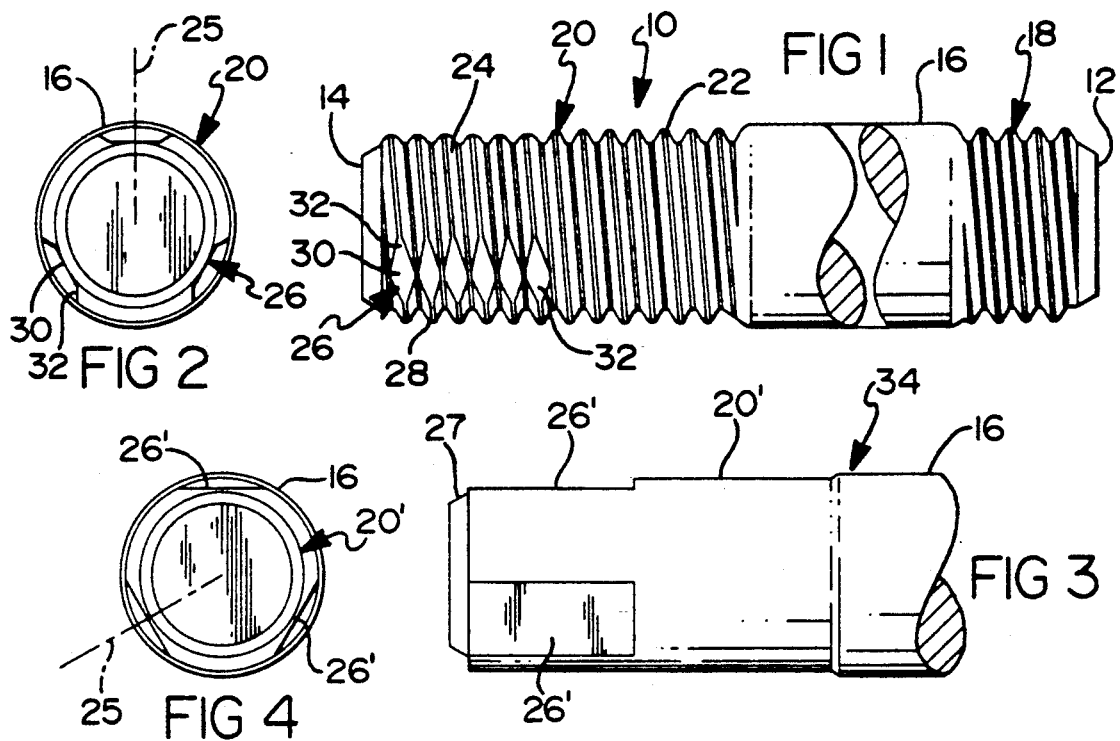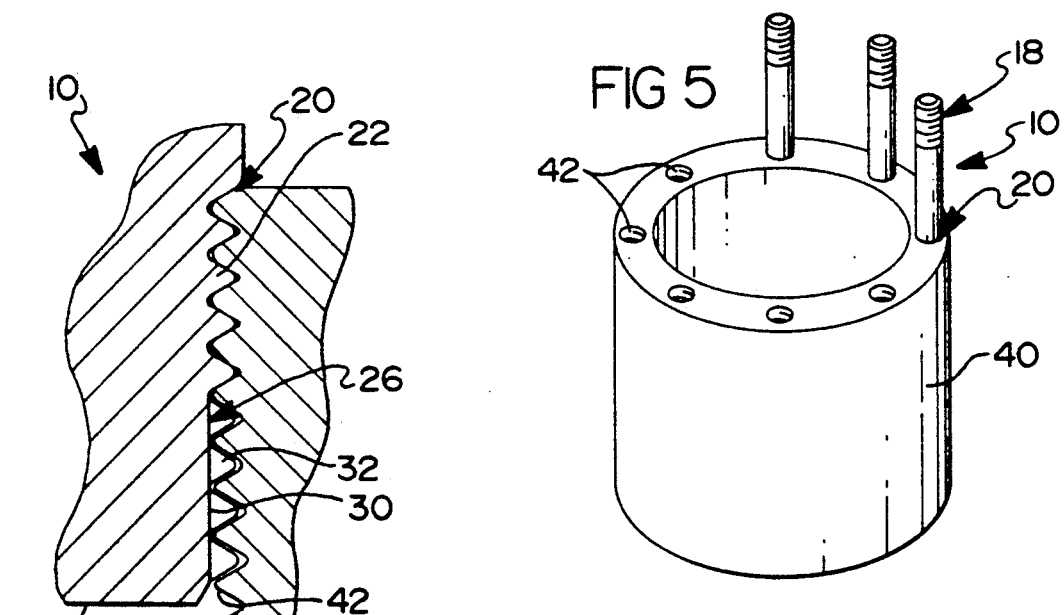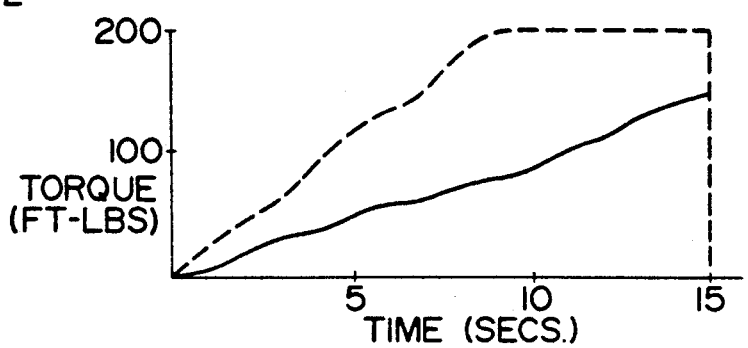

MODIFIED ROLLED THREAD FORM FOR STUDS

TECHNICAL FIELD

This invention relates to thread forms and particularly to thread forms for studs used in cylinder liners.

BACKGROUND

Cylinder liner assemblies used in large diesel engines include water passages coupled to a head. The head is secured to the liner assembly by several studs which are fastened to the liner. The liner has a threaded hole to receive a threaded end section of each stud. To assure that the studs remain securely fastened to the liner so that the stud does not move when a nut is applied or removed from the outer end, an interference fit is used in the threaded connection. Also, to prevent the leakage around the stud of water entering the threaded hole through porous liner walls, full thread engagement of the outer threads with the hole is required. The ANSI standard B1.12 "Class 5 Interference-Fit Thread" sets forth the standard specifications for such studs.

When using the standard studs with rolled threads, it was found that the interference fit caused spalling believed to be due to welding of the interface surfaces as a result of high frictional forces. The friction is caused by the geometric interference, micro finish of the mating threads, and debris trapped between the mating threads during installation. During installation of a class 5 thread, material is shaved off or spalls off the mating threads and becomes trapped in the thread interface. This trapped debris increases the thread interference and gouges the threads creating larger balled up debris. If the debris acquires sufficient size, the friction and driving torque increase until failure occurs. The installation of the standard studs was marked by high torque and failures such as stripping the thread form on both the male and female mating members, cracking of the female threaded member due to excessive hoop stress, torsional failure of the fastener through the minor diameter of the thread form, and stalling of the fastener before the fastener is driven to the proper depth.

SUMMARY OF THE INVENTION

It is therefore an object of the invention to provide a modified interference-fit thread form having lower friction force during installation while maintaining a high breakaway torque. It is another object of the invention to provide such a modified thread form which minimizes the entrapment of debris in the thread interface.

The invention is carried out by a stud for engaging a threaded hole with an interference fit having: a threaded end section with rolled threads, all of the threads except the endmost thread having uniform diameters, including a uniform pitch diameter adapted for interference with the threaded hole; a plurality of interruptions in several threads nearest the end, the remaining threads being full threads; each interruption comprising a locally reduced maximum diameter of the several threads to a value less than the said pitch diameter to form a recess which is symmetrical with respect to a radial plane of the stud; and the minimum diameter of the stud in the threaded section being defined by the minor thread diameter, whereby the said recess is not deeper than the minor thread diameter.

BRIEF DRAWING DESCRIPTION

The above and other advantages of the invention will become more apparent from the following description taken in conjunction with the accompanying drawings wherein like references refer to like parts and wherein:

FIGS. 1 and 2 are side and end views, respectively, of a stud having a modified thread form, according to the invention;

FIGS. 3 and 4 are side and end views, respectively, of a blank used to make the stud of FIGS. 1 and 2;

FIG. 5 is an isometric view of a cylinder liner with some studs installed;

FIG. 6 is a cross section of mating thread forms according to the invention; and FIG. 7 is a graph showing torque curves for a standard rolled thread and a modified thread formed according to the invention.

DETAILED DESCRIPTION

The ensuing description is directed to a modified thread form which was developed for cylinder liner studs to prevent breakage of liners and studs and also to provide a seal in the event of water leakage from the liner to the tapped hole receiving the stud. Similar advantages may be obtained in other stud applications, especially regarding stud or nut breakage. Some other potential applications are for studs to hold the fuel injector in place on a cylinder head, studs to clamp the cylinder head to the block, and studs to secure rocker arms to cylinder heads.

Referring to FIGS. 1 and 2, a stud 10 with ends 12 and 14 has a shank 16, a standard threaded section 18 adjacent the end 12 and a modified threaded end section 20 adjacent the end 14. The threaded section 20 has at least three full threads 22 adjacent the shank and several interrupted threads 24 adjacent the end 14. The threads are all of equal diameter except for the endmost thread 28 adjacent the end 14 which is a typical starting thread and is gradually reduced in diameter to facilitate starting the stud in a nut. A chamfer 27 is formed at the end 14.

Each interrupted thread has three gaps equally spaced around the stud to form three axial recesses or channels 26 forming relief zones extending from the endmost thread 28 adjacent the end 14 to the beginning of the full threads. Preferably the channel length is 50 to 60% of the length of the threaded section 20. The bottom 30 of each channel 26 is generally flat and the sides are sloped due to the ramped ends 32 of the interrupted threads 24. The ends are sloped at an angle of about, say, 30° with respect to the bottom 30. Each channel 26 is symmetrical with respect to a radial plane 25 of the stud and is normal to the plane 25. The bottom 30 of the channel is at or above the core defined by the minor diameter of the thread so that the channel does not diminish the minimum cross section of the threaded section which is established by the thread. Thus the center of the bottom 30 is tangent to the core or parallel to the tangent and a few thousandths of an inch above the tangent. The bottom 30 of the channel must be somewhat below the pitch diameter to afford relief from the thread interference.

The end of the blank 34 used to make the stud is shown in FIGS. 3 and 4. The blank comprises a shank 16, a reduced diameter end section 20', a chamfer 27 and three equally spaced flats 26' adjacent the end. Each flat is symmetrical with respect to a radial plane 25 and normal thereto. The width of the flat is typically approximately equal to the nominal radius of the stud or larger. i.e. a ¾ inch stud would have a blank flat width of about ⅜ inch. The end section 20' is cylindrical but for the flats 26' and the chamfer 27, so that the threaded product will have threads of uniform major, minor and pitch diameters except for the endmost thread 28. The threads are formed by rolling. As a result of the rolling operation, the ends of the threads 24 are raised above the flats 26' to form the sloped ends of the threads at the sides of the channel 26. The resultant gap between the thread ends will be about ¼ inch for the ¾ inch stud example.

A cylinder liner 40 having threaded holes 42 for receiving the studs 10 is shown in FIG. 5, while FIG. 6 shows a cross section of a stud 10 with a modified thread end section 20 engaged in the threaded hole 42 or other nut. The threads 22 and 24 all make interfering engagement. The channels 26 provide a relief between the interrupted threads 24 to allow any debris developed during stud installation to remain clear of the threads 24 or even to escape to the bottom of the hole, thereby minimizing the entrapment of debris in the thread interface where the external threads 22, 24 engage the internal threads of holes 42. A second effect of the channels 26 is that they help relieve the hoop stress in the liner or nut 42. The diagram of FIG. 7 shows the driving torque of a full rolled thread in a broken line and of the modified rolled thread in a solid line, both threads having the same diameters. Typically the maximum torque is reduced by 25% and the rate of torque increase is more uniform for the modified thread compared to the conventional full thread.

The preferred dimensions of the modified stud and the corresponding threaded hole are slightly changed from the standard ANSI specifications. For a ¾-10 rolled thread on the stud and a corresponding cut thread in the nut or liner, the following table gives the thread diameters in inches.

|  | Internal thread | External Thread |
| --- | --- | --- |
| Major Diameter | 0.7360–0.7290 | 0.7500 min |
| Pitch Diameter | 0.6935–0.6910 | 0.6860–0.6895 |
| Minor Diameter | 0.6378 max | 0.645–0.662 |

With this thread size, the flats 26' on the blank extend 60% of the axial length of the threaded section 20 and are 0.015 inch less deep than the minor diameter of the thread so as not to decrease the minimum cross section of the stud. There are at least three full threads 22 engaged with the internal threads of the hole 42. The three full threads 22 carry 80% of the tensile load thereby providing this thread form with the equivalent tensile load handling capabilities of a full thread form. The relief zones or channels 26 provide cavities where the debris formed during installation can escape from the thread interface to prevent high localized interference. Hoop stress in the mating female member 42 is decreased 35% by decreasing the nut deflection at the relief zones. Although the thread is not designed as a self-tapping thread, the starting portion of the modified thread form acts essentially as a tap before the full thread form engages the threaded hole 42. The spalling, which normally occurs with a class 5 fit, takes place in the first few threads which have a relief to accept the debris, and the internal threads are sufficiently enlarged that only little further galling takes place between the full threads and the nut.

The advantages resulting from these features include easier installation with fewer failures of the studs as well as the liners or other female devices while maintaining the high breakaway torque so that the stud does not move when a nut is installed on or removed from the other end of the stud.

The embodiments of the invention in which an exclusive property or privilege is claimed are defined as follows:

1. A stud for engaging a threaded hole in a cylinder liner having:
   a shank, an end, and a threaded section adjacent the end;
   the threaded section having a plurality of full threads adjacent the shank and a plurality of axially extending relief zones extending from the full threads to the end for interrupting threads adjacent the end;
   the full and partial threads having the same uniform major and pitch diameters and a minor diameter defining the smallest cross section of the threaded section; and
   the relief zones lying outside the minor diameter of the threads.

2. A stud for engaging a threaded hole with an interference fit having:
   a threaded end section with rolled threads, all of the threads except the endmost thread having a uniform major diameter and a uniform pitch diameter adapted for interference with the threaded hole;
   a plurality of interruptions in several threads nearest the end, the remaining threads being full threads;
   each interruption comprising a locally reduced maximum diameter of the several threads to a value less than the said pitch diameter to form a recess which is symmetrical with respect to a radial plane of the stud; and
   the minimum diameter of the stud in the threaded section being defined by the minor thread diameter, whereby the said recess is not deeper than the minor thread diameter.

3. The invention as defined in claim 2 wherein each said recess has a substantially flat bottom portion which is normal to the said radial plane.

4. The invention as defined in claim 2 wherein the minor thread diameter defines a core of the threaded section, and each said recess has a substantially flat bottom region which is substantially tangent to the said core.

5. A stud for engaging a threaded hole with an interference fit having:
   a threaded end section with rolled threads, all of the threads except the endmost thread having a uniform pitch diameter adapted for interference with the threaded hole, whereby debris is produced upon assembly of the stud to the threaded hole;
   means for receiving said debris to prevent entrapment of debris between the interfering threads comprising a plurality of channels axially extending through several threads adjacent the end and above the minor diameter of such threads; and
   each channel being symmetrical with respect to a radial plane of the stud.

6. The invention as defined in claim 5 wherein each channel has a substantially flat bottom approximately tangent to the root of the threads, and is bounded by sloped thread ends on either side of the flat bottom.

7. The invention as defined in claim 5 wherein the rolled threads of the end section of the stud and the threads of the associated threaded hole approximate the ANSI standard B1.12 "Class 5 Interference-Fit Thread" of ¾-10 size modified to have a diametral interference at the pitch diameter substantially in the range of 0.0015–0.0075 inches.

* * * * *